United States Patent Office 3,574,775
Patented Apr. 13, 1971

3,574,775
FLUORINATION OF PERHALO COMPOUNDS
George Fuller, Somerset, England, assignor to Imperial Smelting Corporation (N.S.C.) Limited, London, England
No Drawing. Continuation-in-part of application Ser. No. 553,711, May 31, 1966, which is a continuation-in-part of application Ser. No. 278,422, May 6, 1963. This application Apr. 22, 1968, Ser. No. 723,290
Int. Cl. C07c 25/04
U.S. Cl. 260—650                                    4 Claims

ABSTRACT OF THE DISCLOSURE

Use of the solvent sulpholane (otherwise known as tetrahydrothiophen 1,1-dioxide or tetramethylene sulfone) in a halogen exchange reaction between a chlorinated benzene fully substituted with halogen atoms and a dry alkali metal fluoride enables one to produce fluorinated benzenes fully substituted with halogen atoms more than three of which are fluorine atoms, e.g. chloropentafluorobenzene and hexafluorobenzene.

CROSS-REFERENCES TO RELATED APPLICATIONS

This application is a continuation-in-part of my application Ser. No. 553,711 filed May 31, 1966, now abandoned, which is in turn a continuation-in-part of my application Ser. No. 278,422 filed May 6, 1963 and now abandoned.

BACKGROUND OF THE INVENTION (1) Field of the invention

This invention relates to the fluorination of benzenes fully substituted with halogen atoms at least one of which is a halogen atom other than fluorine whereby more highly fluorinated benzenes are obtained.

(2) Description of the prior art

It was formerly considered that aryl halides must be suitably activated, often by the presence of nitro-groups in the ring, in order to undergo a halogen exchange reaction with alkali metal fluorides (J. F. Bunnett and R. Zahler, Chem. Revs., 1951, 49, 273; J. Sauer and R. Huisgen, Agnew. Chemie, 1960, 72,294). A typical example of this kind is the conversion of 1-chloro- 2,4-dinitrobenzene to the 1-fluoro-compound using potassium fluoride in nitrobenzene at 200° C. (H. B. Gottlieb, J. Amer. Chem. Soc., 1936, 58, 532).

The scope of the reaction was extended to many aryl halides activated by a single nitro-group by the use of the polar aprotic solvents dimethylformamide and dimethyl sulphoxide (G. C. Finger and C. W. Kruse, J. Amer. Chem. Soc. 1956, 78, 6034; G. C. Finger, M. J. Gortakowski, R. H. Shiley and R. H. White, J. Amer. Chem. Soc. 1959, 81, 94). "Aprotic" means that the solvent does not donate protons. The highest yields were obtained in those cases where either the positions ortho and para to the aryl halogen are occupied by electron-withdrawing groups (e.g. 3 - trifluoromethyl-4-chloro-2-chloro-5-acetoxy-nitrobenzene) or where the position para to the aryl halogen is occupied by a nitro-group (e.g. 4-chloro-nitrobenzene). Two of the examples indicate that three suitably placed chlorine atoms may be replaced by fluorine, although yields of products are low. The possible replacement of nitro- groups by fluorine, is however, an added complication. For example, treatment of 2,4,6 - trichloronitrobenzene with potassium fluoride in dimethyl sulphoxide for two hours at 175° C. gives 2,4,6 - trifluoronitrobenzene in 10% yield (Finger and Kruse, loc. cit.), but more recently, no less than 22 components were found in the products of this reaction (G. C. Shaw and D. L. Seaton, J. Org. Chem. 1961, 26, 5227). Similarly, 2,3,4-trichloronitrobenzene is converted into the corresponding trifluoride in 34% yield using dimethylformamide as solvent (Finger, Gortatowski, Shiley and White, loc. cit.).

In Résumé des Communications XVI International Congress of Pure and Applied Chemistry, Paris 1957, Tome II, Division de Chimie Organique, page 303, Finger et al., described studies of fluorination with potassium fluoride in dimethyl formamide and dimethyl sulfoxide. They stated that the reactivity of polychlorobenzenes to KF was examined, and that preliminary results indicated that the 1,2,3,5-tetrachloro-pentachloro-, and hexachlorobenzenes showed considerable liability of certain chlorine atoms. Hexachlorobenzene gave 2,4,6 - trichloro-1,3,5-trifluorobenzene.

There was not teaching in the prior art how to use alkali metal fluorides to obtain the chlorofluoro benzenes having more than three fluorine atoms in the ring by halogen exchange reaction.

Maynard U.S. Pat. No. 3,287,425 filed Mar. 7, 1961 described the fluorination of chlorine-containing aliphatic and cycloaliphatic compounds using an alkali metal fluoride in a solvent having a boiling point of at least 150°. Example I described the reaction of hexachloropropene with potassium fluoride in N-methyl-2-pyrrolidone, and stated that essentially the same products were obtained if the solvent was N,N-dimethylformamide, dimethyl sulfoxide, dimethyl sulfone, tetramethylene sulfone (tetrahydrothiophene 1,1-dioxide, otherwise known as sulpholane) or ethylene carbonate. No particularly preferred solvent was indicated, but those mentioned in the claims were dimethyl formamide, N-methyl pyrrolidone and N-methyl acetamide. This patent contained no teaching about fluorination of aromatic compounds.

The highly fluorinated aliphatic and alicyclic compounds produced in this patent are quite stable, and are not prone to further reaction. In contrast, highly fluorinated aromatic compounds having more than 3 fluorine atoms in the ring are very suspect to nucleophilic attack. Therefore if there is any solvent decomposition leading to decomposition products of a nucleophilic character, the aromatic compounds are liable to further reaction, resulting in a reduced yield of highly fluorinated aromatic product. The Maynard patent contained no teaching about aromatic compounds and the problem of solvent decomposition was not faced.

OTHER RELEVANT LITERATURE

The patentee of U.S. Patent No. 3,287,425, John T. Maynard, in Jouranl of Organic Chemistry, 1963, 28, 112 (published after the dates of British patent applications 18,280, 20,877, 37,626, and 40,628 of 1962, from which priority is claimed) clearly indicated that the preferred N-methyl-2-pyrrolidone and dimethyl sulfone as the solvents. In this paper Maynard also made reference to reaction of hexachlorobenzene with potassium fluoride in N-methyl pyrrolidone. He found that 1,3,5-trichlorotrifluorobenzene was the major product. By retreating all fluid fractions from an initial fluorination of hexachlorobenzene he obtained a 34% yield of $C_6Cl_2F_4$ and a "small" yield of $C_6ClF_5$. It was not possible to push the reaction all the way to hexafluorobenzene.

Holbrook et al. in Jouranl of Organic Chemistry, 1966, 31, pages 1259 to 1261 (published after the filing date of my earlier application Ser. No. 278,422) described the reaction of hexachlorobenzene with potassium fluoride in N-methyl pyrrolidone at 200° C. The fluorination was found to be straightforward until three chlorine atoms had been replaced, after which hydrogen substitution occurred. It was established that 1,3,5-trichlorotrifluorobenzene was quite unreactive in the system. It was postulated that this was because in 1,3,5-trichlorotrifluorobenzene all fluorine atoms are meta to each other, leading to a mutual deactivation toward further nucleophilic attack on the remaining positions.

SUMMARY OF THE INVENTION

I discovered that sulpholane (tetrahydrothiophen-1,1-dioxide) is preferable to other aprotic solvents for the halogen exchange reaction of alkali metal fluorides with hexachlorobenzene and the chlorofluorobenzenes. I discovered that better yields of the highly fluorinated products having more than three fluorine atoms in the ring could be obtained by using sulpholane than by using other polar aprotic solvents.

The invention consists in a method of preparing fluorinated benzenes fully substituted with halogen atoms selected from the group consisting of chlorine and fluorine atoms, more than three of which are fluorine atoms, comprising reacting a chlorinated benzene fully substituted with halogen atoms selected from the group consisting of chlorine and fluorine atoms having less fluorine atoms than the desired product, in sulpholane, with a dry fluoride of alkali metal selected from the group consisting of potassium, rubidium and caesium for a period of between 5 and 48 hours and at a temperature in the range of 150° C. to 290° C., to replace at least one chlorine atom in said chlorinated benzene by a fluorine atom, and isolating the products having more than three fluorine atoms.

The starting material in the method of the invention may be hexachlorobenzene, pentachloromonofluorozene, tetrachlorodifluorobenzene, trichlorotrifluorobenzene, dichlorotetrafluorobenzene, or monochloropentafluorobenzene. When the starting material contains less than 3 fluorine atoms, it is considered that trichlorotrifluorobenzene is formed in the reaction mixture during the halogen exchange reaction. The invention is concerned with increasing the fluorine substitution beyond 3 fluorine atoms.

Tre invention may therefore be described as a method of increasing the fluorine substitution of chlorofluoroaromatic compounds comprising reacting an aromatic compound selected from the group consisting of trichlorotrifluorobenzene, dichlorotetrafluorobenzene, and monochloropentafluorobenzene, in sulpholane, with a dry fluoride of an alkali metal selected from the group consisting of potassium, rubidium and caesium for a period of between 5 and 48 hours and at a temperature in the range of 150 to 290° C. to replace at least one chlorine atom in said aromatic compound by a fluorine atom. The starting material may be trichlorotrifluorobenzene, or a mixture containing trichlorotrifluorobenzene, prepared from hexachlorobenzene by reaction with an alkali metal fluoride in a polar aprotic solvent other than sulpholane. Sulpholane is utilized for the preparation of highly fluorinated aromatic compounds because of its high boiling point and good thermal stability. However, it is not fully understood why sulpholane gives better results than comparable solvents of better thermal stability.

The method according to the invention can clearly be used to prepare dichlorotetrafluorobenzenes including 1,3 - dichlorotetrafluorobenzene, chloropentafluorobenzenes showed considerable liability of certain chlorine valuable intermediates for preparing other highly fluorinated aromatic compounds.

Hitherto, the chlorofluorobenzenes have been inaccessible compounds and consequently there is little information about them in the literature. For example, chloropentafluorobenzene has been prepared previously in low yield by treatment of hexachlorobenzene with bromine trifluoride, followed by further fluorination of the complex product with antimony pentafluoride, and dechlorinating the mixture thus obtained with zinc dust in ethanol (E. T. McBee, V. V. Lindgren and W. B. Ligett, Ind. Eng. Chem., 1947, 39, 378; U.S.P. 2,586,364). This work has recently been repeated, and it is quite clear that only low yields of aromatic compounds are obtained and the method is not practical (R. E. Florin, W. J. Pummer and L. J. Wall, J. Research Natl. Bur. Standards, 1959, 62, 107).

A feature of the present invention is the difference in reactivity of the alkali metal fluorides as fluorinating agents. This effect is apparent in the particular reaction of hexachlorobenzene with the following alkali metal fluorides in sulpholane at 230°–240°. Sodium fluoride shows little reactivity as a fluorinating agent; most of the hexachlorobenzene is recovered, but traces of a material believed to be pentachlorofluorobenzene are produced. Under identical conditions, potassium fluoride reacts smoothly to give in high yield a product consisting of hexafluorobenzene, chloropentafluorobenzene, 1,3 - dichlorotetrafluorobenzene and trichlorotrifluorobenzene, in this case no unchanged starting material is detected. When caesium fluoride is used care must be taken that degradation does not take place. Potassium fluoride is the preferred fluorinating agent for fluorinating hexachlorobenzene.

In the fluorinating step according to the invention the degree of substitution is dependent on both the reaction temperature and the duration of reaction. Reaction periods of between 5 hours and 48 hours are generally used: longer periods tend to cause decomposition of the solvent.

The reaction temperature at atmospheric pressure is conveniently in the range 150°–290° C. Temperatures outside this range may also be used, and this range is not intended to be a limiting factor. The maximum reaction temperature at atmospheric pressure is obviously limited by the boiling point of the solvent.

The reaction may also be carried out in an autoclave at superatmospheric pressures, or at subatmospheric pressures. It is, however, most conveniently carried out at atmospheric pressure.

Since an alkali metal fluoride has a limited solubility in the solvent (sulpholane), the preferred method for carrying out the reaction is to provide vigorous stirring of the reactants during the reaction period.

It is preferable to use the alkali metal fluoride in a finely-divided condition and to dry it before use.

An added advantage is that the products may be distilled directly out of the reaction mixture, followed by the recovery of the solvent by further distillation. In a preferred method of operating the invention the reaction vessel is fitted with a fractionating column and, as the fluorination proceeds, the more highly fluorinated products may be taken from off the top of the column.

Polyfluoro-aromatic compounds, e.g. hexafluorobenzene, decafluorobiphenyl, have properties which make them useful as fluids which are both thermally stable and stable to high energy radiation. In addition, these compounds do not support combustion and are highly resistant to oxidation. Thus, they may be used as non-flammable hydraulic fluid lubricants and in reactor coolants. It is known, for example, that hexafluorobenzene is at least as resistant to gamma irradiation as benzene (R. E. Florin, L. A. Wall, and D. W. Brown, J. Research Natl. Bur. Standards, 1960, 64A, 269).

Hexafluorobenzene, and decafluorobiphenyl are also versatile intermediates for the preparation of other highly fluorinated compounds, e.g. pentafluoroaniline, pentafluorophenol, or pentafluorothiophenol.

Polyfluoro-aromatic compounds therefore possess a number of desirable and unusual properties. Progress in this area has, however, been hampered by the lack of suitable methods of preparing these compounds. There is, for instance, no known method for producing hexafluorobenzene from benzene by a one-stage process. There is therefore a real need for a simple, direct method of preparing such compounds from readily available starting materials and cheap flourinating agents.

The chlorofluorobenzenes prepared from hexachlorobenzene, e.g. chloropentafluorobenzene, 1,3-dichlorotetrafluorobenzene, do not support combustion and possess thermal stability. They are useful as heat exchange fluids, and stable solvents.

It is well known in the art that metadisubstituted tetrafluorophenyl- compounds have hitherto been inaccessible. The 1,2,3,5-tetrafluorophenyl- compounds of the present invention therefore are useful intermediates for the preparation of meta-oriented polyphenyl ethers which possess useful properties as stable fluids and elastomers. Para-substituted poly(perfluorophenylene) ethers of small molecular weight have already been prepared (W. J. Pummer and L. A. Wall, preprints—Symposia of A.C.S. Meeting, Cleveland, Ohio, p. B-69, April 1960) and these materials range from tacky gums to hard brittle glasses with softening points below 50° C.

The process of the present invention, as disclosed below, offers advantages, which may be listed as follows:

(1) It is the only simple one-stage method of preparing more highly fluorinated aromatic compounds.

(2) The process may be carried out in simple glass or metal equipment.

(3) The fluorinating agent, e.g. KF, can be regenerated from the alkali metal chloride, e.g. KCl, which is formed in the reaction, by the use of hydrogen fluoride.

(4) The method is based on hydrogen fluoride rather than on the more expensive elemental fluorine. The aromaticity of the ring is preserved during this process, so that the method is very economical in the introduction of fluorine into the molecule.

(5) The products are easily separated by distillation. The invention will be further described with reference to the following examples, which are not intended to limit the scope of the invention over that defined in appended claims.

Example 1.—A stirred slurry of potassium fluoride (1160 g., 20 moles) and tetrahydrothiophen-1,1-dioxide (sulpholane, 2560 g.) was dried by azeotropic distillation with benzene (150 cc.) in a 5 litre flask equipped with a thermometer pocket and a 1 foot column packed with glass helices connected to a Dean-Stark take-off head beneath a reflux condenser. The benzene was then removed by distillation at atmospheric pressure, and finally at reduced pressure (59 mm.). Hexachlorobenzene (570 g., 2.0 moles) was then added and the mixture was stirred at 230° for 18 hours. After about 5 hours at 230°, a colourless liquid (B.P. 120–130°) was slowly taken off at the top of the column during the course of the reaction. Distillation was then continued under reduced pressure to give a liquid fraction (287 g., B.P. 66–82°/24 mm.) and a solid (89.6 g., B.P. 130/24 mm.). Finally, sulpholane (2234 g., 87%), B.P. 129°/5 mm. was recovered.

The combined liquid products from the experiment (287 g.) were washed with water, dried (CaSO$_4$), and fractionally distilled through a 2 foot column packed with Dixon gauzes to give:

| | G. |
|---|---|
| (1) B.P. 100–160° | 9.82 |
| (2) B.P. 116–116.5° | 72.92 |
| (3) B.P. 116.5–118° | 28.04 |
| (4) B.P. 118–156° | 10.22 |
| (5) B.P. 156–157° | 103.11 |
| Residue | 50.60 |

Fraction 1 contained a mixture of hexafluorobenzene (13%) and chloropentafluorobenzene (81%); the former was separated by gas chromatography and identified by its infra-red spectrum.

Fraction 2 was redistilled and gave chloropentafluorobenzene B.P. 116.5°/756 mm., $n_D^{20}$ 1.4244. Found (percent): C, 35.1; Cl, 17.0; F, 46.9. Calcd. for $C_6ClF_5$ (percent): C, 35.5; Cl, 17.5; F, 46.9). An infra-red spectrum of the vapour showed a strong peak at 1513 cm.$^{-1}$, indicating the presence of an aromatic compound.

Fraction 5 was redistilled to give 1,3-dichlorotetrafluorobenzene, B.P. 155–155.5°/759 mm. $n_D^{20}$ 1.4678. (Found (percent): C, 32.2; Cl, 31.9; F, 34.8. Calcd. for $C_6Cl_2F_4$ (percent): C, 32.9; Cl, 32.4; F, 34.7). An infra-red spectrum of the liquid showed absorptions at 1621 (medium), 1503 (strong) and 1467 (strong) cm.$^{-1}$ in the aromatic region.

A portion of the white solid which distilled out of the reaction mixture was twice recrystallized from ethanol to give trichlorotrifluorobenzene, M.P. 61–62°, B.P. 182–183°/747 mm. (Found (percent): F, 24.4. Calcd. for $C_6Cl_3F_3$ (percent): F, 24.2.)

The molar yields of products in this reaction were: $C_6F_6$ (0.4%); $C_6ClF_5$ (27%); $C_6Cl_2F_4$ (25%); $C_6Cl_3F_3$ (30%).

Example 2.—Potassium fluoride (58 g., 1.0 mole) in sulpholane (150 cc.) was dried with benzene (40 cc.) as in Example 1, and benzene was then removed by distillation. 1,3-dichlorotetrafluorobenzene (21.9 g., 0.1 mole), prepared as in Example 1, was added and the mixture was stirred at 220° for 24 hours. The mixture was then poured on to ice-water (250 g.) and steam distilled. The distillate (16.9 g.) was examined by gas chromatography and contained a mixture of $C_6ClF_5$ (32%) and $C_6Cl_2F_4$ (66%). The presence of chloropentafluorobenzene was confirmed by its infra-red spectrum. Molar yield: $C_6ClF_5$ 25.7%; $C_6Cl_2F_4$ 51%.

Example 3.—Dry caesium fluoride (76 g., 0.5 mole), chloropentafluorobenzene (45.5 g., 0.22 mole) and dry sulpholane (200 cc.) were stirred under reflux at 160–170° in a 500 cc. flask fitted with a thermometer pocket and 6 in. fractionating column surmounted by a reflux condenser and drying tube. After 10.5 hr. the temperature was slowly raised to 190° while a fraction, B.P. 80–82° (12.2 g.), was collected during 7 hours. The residue was then poured on to ice and steam distilled to give a colourless distillate (27.0 g.). The combined products consisted of a mixture of hexafluorobenzene (17.5 g.) and unchanged chloropentafluorobenzene (21.2 g.) as determined by gas chromatography. The yield of hexafluorobenzene based on consumed chloropentafluorobenzene was 78%.

This procedure of stirring the reactants in a flask is more convenient and is to be preferred for the following reasons:

(1) It requires simple apparatus and is done at atmospheric pressure.

(2) The product can be distilled off as it is formed.

(3) The fluorination is carried out at a lower temperature and hence carbon recovery is enhanced.

Example 5.—The conversion of chloropentafluorobenzene into hexafluorobenzene with caesium fluoride in dry sulpholane was carried out under various conditions of temperature and reaction period. The general procedure was as follows:

Caesium fluoride was dried on a vacuum hotplate at 130–150° for 7 hours and was then quickly transferred to a glass tube of about 100 cc. capacity. Chloropentafluorobenzene and sulpholane were then added quickly to the caesium fluoride and the tube was sealed and heated in a shaking furnace. The cold tube was opened and the contents poured on to ice water and steam distilled. The product was then weighed and analyzed by gas chromatography. The results are tabulated.

| $C_6F_5Cl$ (g.) | CsF (g.) | Sulpholane (cc.) | Temp. (°C.) | Time (hr.) | Product (g.) | Composition by gas chromatography (percent) | | Carbon Recy. (percent) | Yield of $C_6F_6$ based on $C_6F_5Cl$ consumed (percent) |
|---|---|---|---|---|---|---|---|---|---|
| | | | | | | $C_6F_6$ | $C_6ClF_5$ | | |
| 10.10 (0.05 mole) | 17.5 (0.115 mole) | 30 | 130 | 5 | 9.67 | 0.1 | 99 | 96 | |
| 10.56 (0.052 mole) | 15.5 (0.102 mole) | 30 | 182 | 10 | 8.59 | 16 | 83 | 81 | 44 |
| 11.12 (0.054 mole) | 18 (0.12 mole) | 30 | 192 | 10.5 | 8.33 | 30 | 70 | 77 | 51 |
| 10.64 (0.053 mole) | 30.0 (0.20 mole) | 36 | 192 | 48 | 5.90 | 65 | 33 | 58 | 49 |

Chloropentafluorobenzene may be used in any of the following reactions to give the highly fluorinated aromatic compounds indicated:

(a) Heating it with copper bronze to between 260° C. and 400° C. for several hours (preferably at 360° C. for 90 hours) to give decafluorobiphenyl. A process for preparing decafluorobiphenyl in two stages from hexachlorobenzene is therefore now available, and this offers several advantages over previous routes based on the relatively inacessible bromo- or iodopentafluorobenzene, which will be readily appreciated by those skilled to the art.

(b) Heating it with an alkali metal methoxide to give methoxychlorotetrafluorobenzenes.

(c) Mixing it with an alkali metal hydrogen sulphide to give chlorotetrafluorothiophenols.

(d) Heating it under reflux with an alkali metal hydroxide to give chlorotetrafluorophenols.

(e) Heating it with ammonium hydroxide under pressure in a sealed vessel to give aminochlorotetrafluorobenzene.

(f) Heating it under reflux with hydrazine hydrate to give hydrazinochlorotetrafluorobenzenes.

(g) Passing it together with hydrogen over a palladium catalyst to give pentafluorobenzene.

In view of the previous report by Florin et al, J. Res. Natl. Bureau of Standards, 1959, 62, 119, it is surprising to find that chloropentafluorobenzene reacts smoothly with hydrogen (over a 10% palladium on carbon catalyst) to give pentafluorobenzene (in 82% yield). No other major products are formed. This process for preparing pentafluorobenzene in two stages from hexachlorobenzene offers advantages over previous routes to this compound.

1,3-dichlorotetrafluorobenzene may be passed together with hydrogen over a palladium catalyst to give 1,2,3,5-tetrafluorobenzene and 1 - chloro - 2,3,4,6 - tetrafluorobenzene.

As disclosed in a recent patent, 1 - chloro - 2,3,4,5-tetrafluorobenzene reacts with hydrogen over a 10% palladium on active carbon catalyst to give 1,2,3,4 - tetrafluorobenzene (W. J. Pummer, L. A. Wall and R. E. Florin, U.S.P. 2,967,894).

The 1,2,3,5-tetrafluorobenzene may be warmed with oleum and elemental bromine to give 1,3-dibromotetrafluorobenzene.

The key to the present invention is the discovery that sulpholane, quite unexpectedly, shows unique properties in promoting halogen-exchange reactions of the type described. With other solvents, higher degrees of fluorination are *not* achieved merely by the use of more severe reaction conditions.

It will be apparent that many changes and modifications of the several features described herein may be made without departing from the spirit and scope of the invention. It is therefore apparent that the foregoing description is by way of illustration of the invention rather than limitation of the invention.

What is claimed is:

1. A method of preparing fluorinated benzenes fully substituted with halogen atoms selected from the group consisting of chlorine and fluorine atoms, more than three of which are fluorine atoms, comprising reacting a chlorinated benzene fully substituted with halogen atoms selected from the group consisting of chlorine and fluorine atoms having less fluorine atoms than the desired product, in sulpholane, with a dry fluoride of an alkali metal selected from the group consisting of potassium, rubidium and caesium for a period of between 5 and 48 hours and at a temperature in the range of 150° C. to 290° C. to replace at least one chlorine atom in said chlorinated benzene by a fluorine atom, and isolating the products having more than three fluorine atoms.

2. The method of claim 1 wherein the alkali metal fluoride is potassium fluoride.

3. A method of preparing chloropentafluorobenzene which comprises reacting hexachlorobenzene in dry sulpholane with potassium fluoride for a period of between 5 and 48 hours at a temperature about 230° C. and separating chloropentafluorobenzene from the reaction products.

4. A method of increasing the fluorine substitution of chlorofluoroaromatic compounds comprising reacting an aromatic compound selected from the group consisting of trichlorotrifluorobenzene, dichlorotetrafluorobenzene, and monochloropentafluorobenzene in sulpholane, with a dry fluoride of an alkali metal selected from the group consisting of potassium, rubidium and caesium for a period of between 5 and 48 hours and at a temperature in the range of 150 to 290° C. to replace at least one chlorine atom in said aromatic compound by a fluorine atom.

References Cited

UNITED STATES PATENTS 3,287,425  11/1966  Maynard _____ 260—650F
3,388,174  6/1968  Fielding et al. _____ 260—650F

OTHER REFERENCES

Finger et al.: Abstracts, Organic Chemistry Division, XVI International Congress of Pure and Applied Chemistry, Paris, July 1957, p. 303.

Finger et al.: J. Am. Chem. Soc., 78, 6034–6037 (1956).

DANIEL D. HOROWITZ, Primary Examiner